(12) United States Patent
Zou et al.

(10) Patent No.: US 9,355,250 B2
(45) Date of Patent: May 31, 2016

(54) METHOD AND SYSTEM FOR RAPIDLY SCANNING FILES

(71) Applicant: BEIJING QIHOO TECHNOLOGY COMPANY LIMITED, Xicheng, Beijing (CN)

(72) Inventors: Guiqiang Zou, Beijing (CN); Min Fu, Beijing (CN)

(73) Assignee: Beijing Qihoo Technology Company Limited, Xicheng District, Beijing (CN)

( * ) Notice: Subject to any disclaimer, the term of this patent is extended or adjusted under 35 U.S.C. 154(b) by 0 days.

(21) Appl. No.: 14/377,014

(22) PCT Filed: Feb. 5, 2013

(86) PCT No.: PCT/CN2013/071383
§ 371 (c)(1),
(2) Date: Aug. 6, 2014

(87) PCT Pub. No.: WO2013/117151
PCT Pub. Date: Aug. 15, 2013

(65) Prior Publication Data
US 2015/0007328 A1 Jan. 1, 2015

(30) Foreign Application Priority Data

Feb. 7, 2012 (CN) .......................... 2012 1 0026585
Feb. 7, 2012 (CN) .......................... 2012 1 0026759
Feb. 7, 2012 (CN) .......................... 2012 1 0026760

(51) Int. Cl.
*G06F 21/44* (2013.01)
*G06F 21/56* (2013.01)
(Continued)

(52) U.S. Cl.
CPC ........ *G06F 21/564* (2013.01); *G06F 17/30386* (2013.01); *G06F 21/55* (2013.01); *G06F 21/552* (2013.01); *H04L 43/08* (2013.01); *G06F 21/561* (2013.01)

(58) Field of Classification Search
CPC ....... G06F 21/55; G06F 21/56; G06F 21/561; H04L 63/145
USPC .......................................................... 726/26
See application file for complete search history.

(56) References Cited

U.S. PATENT DOCUMENTS 7,392,544 B1 * 6/2008 Pavlyushchik ........ G06F 21/562
713/187
7,934,261 B1 * 4/2011 Saguiguit et al. ............... 726/24
(Continued)

OTHER PUBLICATIONS

English translation of Abstract only of Chinese Application No. CN1964357A, Publication Date: May 16, 2007, Country: China, Inventor(s): Bo Li, Title: A Method to Process File and Information Processing Device.
(Continued)

*Primary Examiner* — Hadi Armouche
*Assistant Examiner* — Bryan Wright
(74) *Attorney, Agent, or Firm* — James M. Stipek; Polsinelli PC

(57) ABSTRACT

The present embodiments provide a method and system for rapidly scanning a file, wherein the method includes obtaining a data packet, the data packet comprising secure file characteristic information for determining whether a file in a system is a secure file, and scanning file characteristic information of files in the system one by one, if the currently scanned file characteristic information matches secure file characteristic information in the data packet identifying a file as a secure file, skipping an anti-virus scanning for the current file, and continuing to scan a next file. By using the data packet, when a new user performs a first scanning, a file with identical characteristic information as that in the data packet can be skipped, which can reduce the time for the first scanning.

14 Claims, 6 Drawing Sheets

(51) Int. Cl.
*G06F 21/55* (2013.01)
*G06F 17/30* (2006.01)
*H04L 12/26* (2006.01)

(56) References Cited

U.S. PATENT DOCUMENTS

| | | | |
|---|---|---|---|
| 8,499,150 B1* | 7/2013 | Nachenberg | 713/158 |
| 2003/0046611 A1* | 3/2003 | Muttik et al. | 714/38 |
| 2010/0138924 A1* | 6/2010 | Heim | G06F 21/566 726/24 |
| 2011/0138465 A1* | 6/2011 | Franklin et al. | 726/23 |
| 2012/0110667 A1* | 5/2012 | Zubrilin | G06F 21/56 726/24 |
| 2014/0298470 A1* | 10/2014 | Yablokov | G06F 21/56 726/24 |

OTHER PUBLICATIONS

English translation of Abstract only of Chinese Application No. CN101639880A, Publication Date: Feb. 3, 2010, Country: China, Inventor(s): Jian Chen, Title: File Test Method and Device.

English translation of Abstract only of Chinese Application No. CN101308533A, Publication Date: Nov. 19, 2008, Country: China, Inventor(s): Lingfeng Sun, Title: Method, Apparatus and System for Virus Checking and Killing.

English translation of Abstract only of Chinese Application No. CN1937536A, Publication Date: Mar. 28, 2007, Country: China, Inventor(s): Huiyang Liu, Title: Network Management Topological Data Synchronous Refreshing Method and System.

Xin Du, The Slimming of the Antivirus Software, CFAN, Jul. 1, 2008, p. 14, No. 13 (English translation of Abstract only).

International Search Report regarding PCT/CN2013/071383 issued May 2, 2013, 4 pages.

* cited by examiner

```
000000  52 61 72 21 1A 07 00 CF  90 73 00 00 0D 00 00 00  Rar!.....s......
000010  00 00 00 00 30 3D 74 C0  90 2E 00 86 E9 34 81 58  ....0=t......4.X
000020  54 D2 85 02 F7 84 E2 66  74 58 2C 40 1D 33 09 00  T......ftX,@.3..
000030  20 20 00 00 33 36 30 73  64 2E 44 4D 50 00 00 EE  ....360sd.DMP...
000040  C5 10 00 21 91 11 0C 89  26 66 14 02 6F 64 80 40  ...!....&f..od.@
000050  20 9A 88 08 A8 AE AA 00  28 08 6C 84 21 02 30 76  ........(.l.!.0v
000060  13 C0 90 27 86 92 43 C5  62 CD 9E 21 20 4F 8D 27  ...'..C.b..! O.'
000070  89 E0 A8 6A A2 80 51 4D  1E 4E 63 C8 AC 7B 9F 80  ...j..QM.Nc..{..
000080  7C A7 00 20 88 AE AF 2F  70 F3 CF 31 79 5E 8F 22  |.. .../p..1y^."
000090  81 F3 1F 11 D7 C3 84 04  09 FB FD BB A8 C8 12 40  ...............@
0000a0  B8 BC CD F1 92 61 36 41  EF E2 FE FF 8C 8E 6E 66  .....a6A......nf
0000b0  5D 05 05 05 05 05 D5 05  DE 5E 61 90 9B 6F FC 6E  ]........^a..o.n
0000c0  56 7D 95 9F 65 67 D8 59  F9 85 57 95 F5 66 5D EE  V}..eg.Y..W..f].
0000d0  FE 5E FD 93 45 9A 1B 25  19 24 C7 F7 78 39 F6 50  .^..E..%.$..x9.P
0000e0  82 82 17 18 57 E1 E0 65  89 89 4E 77 08 20 E1 F4  ....W..e..Nw. ..
0000f0  26 74 DF 18 15 81 1C 89  87 F5 06 0E 34 25 93 83  &t..........4%..
000100  D8 61 4D 86 F6 58 E4 00  32 E1 3B 3C 39 22 F6 71  .aM..X..2.;<9".q
000110  34 A6 1F ED 2C 2D 36 FD  77 86 11 3F 16 3B D0 4C  4...,-6.w..?.;.L
000120  38 4D 68 EF E3 81 1E E0  70 02 4C 1E 66 2C 4F 66  8Mh.....p.L.f,Of
000130  97 9B 52 F9 37 E5 97 92  AA 5E 4D 28 7C 38 9F 3A  ..R.7....^M(|8.:
000140  99 5F B2 53 D4 75 14 14  73 D2 14 74 F3 D4 3A 00  ._.S.u..s..t..:.
000150  CF 8F 48 1F CF EA F3 BD  58 2D CB 38 11 26 42 D8  ..H.....X-.8.&B.
000160  1A 43 07 63 88 8F 88 49  C1 F2 D7 87 5A AC 11 2B  .C.c...I....Z..+
```

Fig. 3

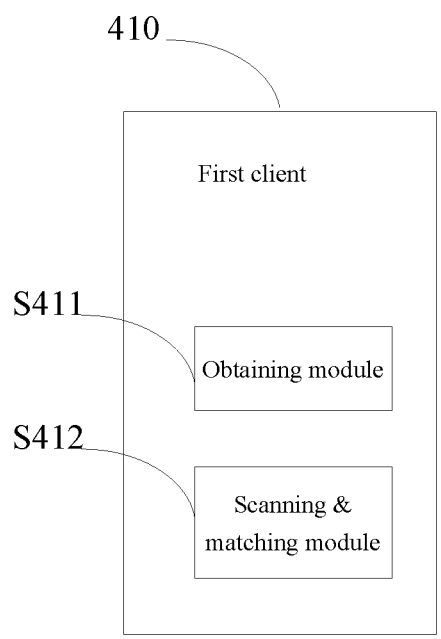

Fig. 4

METHOD AND SYSTEM FOR RAPIDLY SCANNING FILES

FIELD OF THE INVENTION

The invention relates to the field of network technologies, and in particular, to a method and system for rapidly scanning files.

BACKGROUND OF THE INVENTION

With the prevalence of computers, clients basically all need to install anti-virus software to scan files in a computer. When the anti-virus software is scanning, a lot of CPU operations and disk operations are needed, which makes the scanning process long and affects the system speed. However, for files in computers, many are identical, for example, files of Windows, installation packet files, help files, and compressed files, etc. of much softwares.

In the prior art, when scanning the first time, anti-virus software of a client will comprehensively scan all the files within a computer, and will scan various content in a file. For a file comprising large content, it consumes quite much time for scanning, this will lead to a very long time for the first scanning. For example, for a compressed packet, the prior art will, according to a normal scanning process, decompress the content in the compressed packet and scan one by one to ensure that the files are secure. Therefore, for a compressed packet, the scanning time of the prior art is relatively long, and hence the time for the whole scanning is prolonged, whereas for a user, the CPU operations and disk operations being occupied for a long time due to a long-time scanning affect the system speed, thereby influencing the use of the computer by the user.

In addition, anti-virus software will generally record secure files last scanned into a white list, and then when scanning the next time, match a current file with files in the white list one by one; if they match, then skip the current file and enter into a next file scanning process; if they do not match, then fully scan the entire content of the unmatched file, and enter into a next file scanning process after the scanning is finished. In this process, it is needed that the matching and scanning process can be performed on a next file only after a previous file is matched or fully scanned, and the wait time for the next file is relatively long, which gives rise to the problem of the time for scanning the files of the whole system by the whole anti-virus software being relatively long.

SUMMARY OF THE INVENTION

In view of the above problems, the invention is proposed to provide a method and system for rapidly scanning a file which overcomes the above problems or at least in part solve the above problems.

According to an aspect of the invention, there is provided a method for rapidly scanning a file comprising: obtaining a data packet, the data packet comprising secure file characteristic information for determining whether a file in a system is a secure file; and scanning file characteristic information of files in the system one by one, if the currently scanned file characteristic information matches secure file characteristic information in the data packet identifying a file as a secure file, skipping an anti-virus scanning for the current file, and continuing to scan a next file.

According to another aspect of the invention, there is provided a system for rapidly scanning a file, which system comprising a first client, the first client comprises:

an obtaining module configured to obtain a data packet, the data packet comprising secure file characteristic information for determining whether a file in a system is a secure file; and a scanning & matching module configured to scan file characteristic information of files in the system one by one, if the currently scanned file characteristic information matches secure file characteristic information in the data packet identifying a file as a secure file, skip an anti-virus scanning for the current file, and continue to scan a next file.

According to yet another aspect of the invention, there is provided a computer program comprising a computer readable code which causes a server to perform the method according to any of claims 1-11, when said computer readable code is running on the server.

According to still another aspect of the invention, there is provided a computer readable medium storing the computer program as claimed in claim 24 therein.

The beneficial effects of the invention lie in that:

Firstly, in this disclosure, by using a data packet comprising secure file characteristic information for determining whether a file in a system is a secure file, when a new user performs a first scanning, if a file with identical characteristic information as that in the data packet is scanned, a long-time scanned and secure file which is represented by the characteristic information may be skipped, which may reduce the time for the first scanning.

Secondly, in this disclosure, two scanning modules are arranged, wherein a characteristic information scanning module is configured to match the characteristic information of a file in a first client system with the characteristic information of a secure file in a data packet, and if the characteristic information of a file in the first client system does not match the characteristic information of a secure file in the data packet, notify a security scanning module to fully scan the file, whereas the characteristic information scanning module continues to scan a next file. In this way, the matching process for the characteristic information of a file and the full scanning process for the file by the first client are separated, the scanning of a previous unmatched file will not affect the matching of a next file, which saves the waiting time therein and thereby expedites the scanning speed of a file.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings:

FIG. 3 is an example of the header of a compressed packet according to an embodiment of the invention;

FIG. 4 is a structural diagram of a system for rapidly scanning a file according to an embodiment of the invention;

DETAILED DESCRIPTION OF THE INVENTION

In the following the invention will be further described in connection with the drawings and the particular embodiments.

In practice, for clients in a certain order of magnitude (e.g., 105) or more, when clients in the order of magnitude or more scan files with identical features (e.g., including the file name, file size, file modification time, file content description information, content information, etc.), if such files are secure, then it is also substantially secure when other users use files with the same features. This application does perform statistics on characteristic information of files which are secure and time-consuming for fully scanning by a huge number of users according to such points, and then generates a data packet to be matched (upgrade patch, etc.) based on the characteristic information. After using the data packet, a user may scan the characteristic information of a file and match it with characteristic information in the data packet, and if they match, skip such files for which the normal scanning time is relatively long, thereby achieving the purpose of saving the scanning time.

Figure 1:
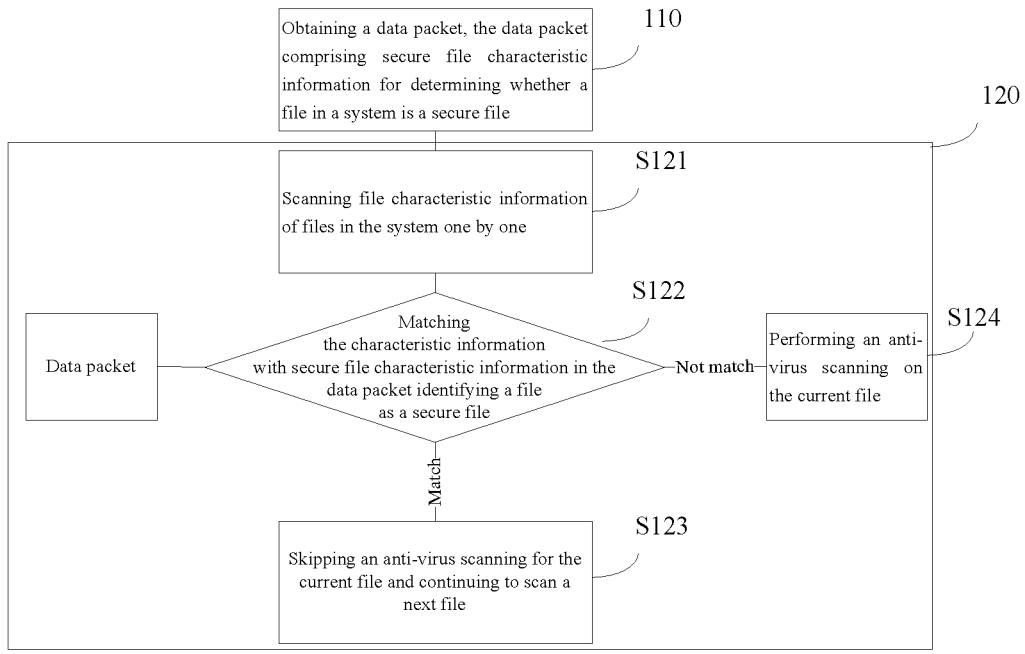
FIG. 1 is a flow diagram of a method for rapidly scanning a file according to an embodiment of the invention.

Reference is made to FIG. 1, which shows a flow diagram of a method for rapidly scanning a file of the application, comprising the following steps.

In step 110, obtaining a data packet, the data packet comprising secure file characteristic information for determining whether a file in a system is a secure file.

A new client first obtains a data packet comprising security characteristic information, and then the new client may scan according to the data packet, to save the time for the first scanning. Therein, the new client is described in this application as a first client, which first client mainly comprises a client in which anti-virus software is not installed and a client in which anti-virus software is installed, but a comprehensive file scanning has not been performed, and may also comprise a client in which anti-virus software is installed, and a comprehensive file scanning has been performed, but a new un-scanned file occurs after the last comprehensive file scanning was performed.

The first client may obtain the data packet by installing an installation packet storing the data packet therein, or upgrading installed anti-virus software. In practice, the first client may not scan at all, or also may obtain many new files during use, but the client may also not fully scan these files, and when the client wants to rapidly scan, it can be done by using the data packet of the application.

Therein, the characteristic information in the data packet for determining whether a file in a system is a secure file may be obtained by performing statistics on full scanning results of individual clients. For example, for results of full scanning by multiple users, for a file with identical characteristic information (e.g., such characteristic information as the file size, file modification time, file name CRC value, and content matching information, etc.) in the individual clients, if the results for scanning the file by the individual clients are secure, then the characteristic information may be stored in the data packet for determining that a file in a system with the characteristic information is a secure file.

Figure 2:
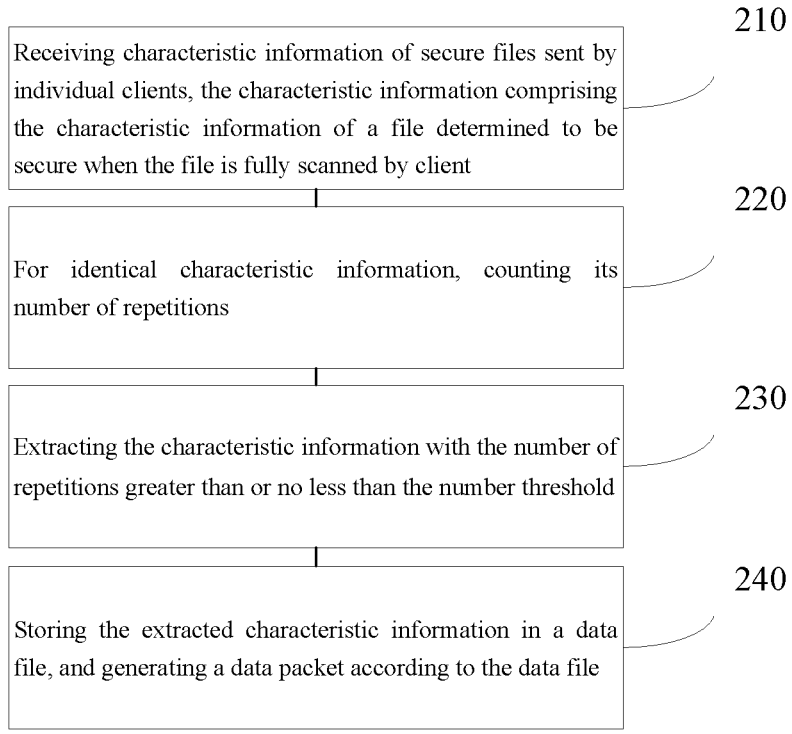
FIG. 2 is a flow diagram of a method for generating a data packet according to an embodiment of the invention.

Optionally, the characteristic information is obtained by performing statistics on secure file characteristic information sent into a processing center server by the individual clients. Namely, for characteristic information of files confirmed to be secure by fully scanning by the individual clients, the processing center server automatically performs statistics and analysis on it, and may generate a corresponding data packet from the characteristic information greater than a certain number threshold. In this application, it is first needed to generate a data packet, referring to FIG. 2, which shows a flow diagram of a method for generating a data packet according to an embodiment of the invention comprising the following steps.

In step 210, receiving secure file characteristic information sent by individual client, the characteristic information comprising the characteristic information of a file determined to be secure when the file is fully scanned by the client.

In practice, there exists a second client group, wherein a large number of clients are comprised, and these clients may all send to the processing center server qualified characteristic information after files in their own systems are fully scanned. Namely, when the individual clients in the second client group select to fully scan files in their computers, they will send the characteristic information of a secure file for which the consumed scanning time is greater than or no less than a certain time threshold to the processing center server.

In practice, this application performs statistics on characteristic information of files which are normal and scanned with a relative long scanning time by a huge number of clients, then generates a data packet to be matched based on the characteristic information of corresponding files with scanning time greater than or no less than a threshold, and then when a new user performs a first scanning, if a file with identical characteristic information as that in the data packet is scanned, a long-time scanned and secure file which is represented by the characteristic information may be skipped, which may reduce the time for the first scanning.

Optionally, when a client fully scans files, the full scanning is to perform an anti-virus scanning on all the content of individual files in the system of the client.

In step S11, when the scanned file is secure, the characteristic information of the file is obtained, which characteristic information comprises the file name, file size, file modification time and file content description information.

When the client selects to fully scan files, a scanning engine scans individual files in the client computer one by one. For many files, e.g., for a compressed packet, the scanning engine needs to first decompress in the engine according to the requirement of the compressed packet, and then performs an anti-virus scanning on the individual files comprised in the compressed packet, and generally, such a scanning manner needs quite much time; again, for example, for an installation packet of software, the scanning engine also needs to decompress the information in the installation packet and then perform a scanning, which equally needs to consume quite much time. Then, when the time the client spends in scanning the whole file is greater than or no less than a threshold, the characteristic information of the current file may be obtained, which characteristic information comprises the file name, file size, file modification time and file content description information.

When the scanning time is greater than or no less than a time threshold and the file is secure, the characteristic information of the file is obtained, which characteristic information comprises the file name, file size, file modification time and file content description information. Therein, when computing the time for scanning a file by the client, the system API function GetTickCount may be called to compute the scanning time from the start of file scanning to the end of file scanning according to the points in time at which the file scanning begins and the file scanning finishes. For example, if the point in time at which the file scanning begins is 21:50:30 and 00 millisecond, Tuesday, Jan. 17, 2012, and the point in time at which the file scanning finishes is 21:51:30 and 00 millisecond, Tuesday, Jan. 17, 2012, then the time for scanning the current file by the client is 1 minute. If the time threshold is set to be 30 seconds, for this file, the client obtains the characteristic information of the file, including the file name, file size, file modification time and file content description information.

Therein, the file content description information only occupies a very small part of the whole file, and when the client scans the part of the file content description information, the consumed time is far smaller than the time for scanning the whole file. For example, for a compressed file, its file content description information is located in the header data of a compressed packet, and when scanning, the client may only need to scan a byte address space where the header data of the current file is located according to the number of bytes occupied by the current file content description information informed by the header data. Referring to FIG. 3, which is an example of the header data of a compressed packet, the file information (the file name, size, data check value, etc.) within the compressed packet is described in the header data of the compressed packet, and as long as such key data has not been changed, it shows that the content of the compressed packet has not been changed. Again, for example, for an installation packet of software, the content description information is located in the tail data of the installation packet, and when scanning, it may suffice to scan a corresponding byte address space according to the number of bytes occupied by the tail data informed by the file.

In step S12, a cyclical redundancy check computation is performed on the file name to get a file name CRC value.

Since the file name involves the privacy of a user, this application conducts a cyclical redundancy check (CRC) computation for the file name, and gets a file name CRC value without readability.

In step S13, a message digest algorithm computation is performed on the file content description information to get content matching information.

For the file content description information, though relative to the whole file, the file content description information is small, if matching is conducted with the file content description information itself, the time may be relatively much due to the file content description information being bulky. This application conducts a message digest algorithm computation on the file content description information to get content matching information. In general, the application conducts the MD5 (Message Digest Algorithm 5) computation, and the resulting content matching information is an MD5 value. When matching by the MD5 value, it can greatly reduce the matching time, guarantee a rapid contrast match, and at the same time also guarantee the security of the file.

In step S14, the characteristic information comprising the file size, file modification time, file name CRC value and content matching information is sent.

After the characteristic information comprising the file size, file modification time, file name CRC value and content matching information is obtained, the characteristic information may be sent to the processing center server and wait for the processing center server to process.

The application environment of this application comprises the processing center server providing data such as an installation packet related to anti-virus software, an upgrade packet, etc., and a lot of clients connected with the processing center server via a network, and therefore, for a full scanning operation of a file by an online user, the above described steps may be performed.

In step 220, for identical characteristic information, counting its number of repetitions.

In this step, the processing center server will perform a de-duplication operation on the received data, namely, de-duplicate multiple data with identical characteristic information sent by the same client to make its number of times be 1.

Optionally, for identical characteristic information, counting its number of repetitions.

In S21, the received characteristic information is ranked according to the total number of repetitions.

First, the received characteristic information is ranked according to the total number of repetitions. For example, for the characteristic information (m,100 kb, 2012/1/11/21:50:30:10,n) corresponding to some client files, wherein m is the file name CRC value, and n is the content matching information of the file content description information, i.e., the MD5 value, correspondingly, each piece of characteristic information corresponds to a client sending the information. For example, for a client A, the information it sends to the processing center server may be indicated in the form of A-(m, 100 kb, 2012/1/11/21:50:30:10,n). For all the pieces with the same (A,100 k, 2012/1/11/21:50:30:10,B) received by the processing center server, its total number of repetitions is counted, and then ranking is performed according to the total number. In this process of counting and ranking, data with identical characteristic information sent by the same client may be conveniently found out.

In S22, for individual identical characteristic information, a de-duplication operation is performed on identical characteristic information sent by one and the same client.

For multiple data with identical characteristic information sent by one and the same client, for example, if there are 10 pieces of characteristic information of (m,100 kb, 2012/1/11/21:50:30:10,n) sent by the client A, it is de-duplicated, such that the processing center denotes the characteristic information of (m,100 kb, 2012/1/11/21:50:30:10,n) repeatedly sent by the client A as 1 time. As such, the accuracy of the number of users may be guaranteed when performing statistics on some characteristic information, and the effectiveness of this application may be guaranteed.

In S23, for individual identical de-duplicated characteristic information, the number of repetitions of individual characteristic information is counted.

After the de-duplication, the number of repetitions of individual characteristic information may be counted, which number is consistent with the number of clients which scan to get the characteristic information.

This application may further perform a de-duplication operation and count the number of repetitions of individual file characteristic information by means of other methods, which will not be limited by this application.

In step 230, extracting the characteristic information with the number of repetitions greater than or no less than the number threshold.

After the number of repetitions of the characteristic information is obtained, the number of repetitions is compared with the number threshold, and if the number of repetitions is greater than the threshold, it is stored in a data file. For example, if the number of repetitions of the characteristic information of (m,100 kb, 2012/1/11/21:50:30:10,n) is 150, 000 and the threshold is set to be 100,000, then the characteristic information may be extracted.

In step 240, storing the extracted characteristic information in a data file, and generating a data packet according to the data file.

In this application, the data in the data file may exist in the form of list, and each piece of characteristic information comprises multiple dimensions. For example, for (m,100 kb, 2012/1/11/21:50:30:10,n), in the list the piece of characteristic information comprises four dimensions, i.e., file name CRC value, the file size, file modification time and content matching information, respectively. Then, in a subsequent scanning & matching, matching is conducted according to the four dimensions.

For the generated data file, it may be packed into an installation packet of anti-virus software, or also may be generated as the form of an upgrade patch.

In addition, before the generation of a data packet, there is further comprised:

step S210: receiving the characteristic information of an insecure file sent by the client, and not storing the characteristic information in the data file, or deleting characteristic information in the data packet which is identical to the received characteristic information.

For a file for which the time for a full scanning is greater than the threshold and in which a virus has occurred, the client will also mark the characteristic information of the insecure file as insecure, and then send it to the processing center server. The processing center server may not process all the pieces of data with this characteristic information, nor store them in the data file. For example, if there are 50,000 clients which send data of the previous characteristic information of (m,100 kb, 2012/1/11/21:50:30:10,n), but the data of the characteristic information sent by one of the clients is identified as insecure, i.e., a virus is found, then the processing center server may not process data with the characteristic information of (m,100 kb, 2012/1/11/21:50:30:10,n), and not store the characteristic information comprising (m,100 kb, 2012/1/11/21:50:30:10,n) in the data packet.

Additionally, in practice, when performing statistics on characteristic information sent by individual clients, the processing center server generally performs statistics with a certain length of time as the period, and then generates a data packet of characteristic information of secure files from the statistical result for the period. For example, the processing center server performs statistics on characteristic information sent by individual clients taking a day as the time unit, and then generates the data packet, which may be provided to a first client in a next period for use.

In step 120, scanning file characteristic information of files in the system one by one, if the currently scanned file characteristic information matches secure file characteristic information in the data packet identifying a file as a secure file, skipping an anti-virus scanning for the current file, and continuing to scan a next file.

For example, an anti-virus scanning is performed on a malicious code or virus, etc. comprised in the file content.

After the data is obtained, a rapid scanning may be performed.

In step S121, the system of the first client scans characteristic information of files in the system one by one.

In step S122, matching the currently scanned file characteristic information with secure file characteristic information in the data packet identifying a file as a secure file, if they match, the process goes to step S123, skips the current file and continues to scan a next file; and if they do not match, the process goes to step S124, and performs a full anti-virus scanning on the current file, i.e., scans all the content of the current file.

In practice, before the first client scans, there is further comprised: confirming whether to select a rapid scanning or not, and if yes, scanning characteristic information of a file and calling the data packet to conduct matching.

In other words, the first client may select a rapid scanning or a full scanning of a file, and if a fast scanning is selected, scan characteristic information of a file and call the data packet to conduct matching of characteristic information. When the characteristic information of the file matches characteristic information in the data packet, it skips the current file and continues to scan a next file.

In this application, upon scanning the first time, the first client may be prompted whether to select a rapid scanning, and if it selects, then characteristic information of a file is scanned and the data packet is called to conduct matching.

If the first client selects a rapid scanning, when scanning, the first client first obtains characteristic information of a file in the first client to conduct matching, without the need to scan all the content of the file.

When the first client matches the characteristic information of the file with characteristic information in the data packet:

it conducts matching starting from the characteristic information with the highest matching efficiency in a cache.

Since characteristic information in the data packet is multi-dimensional, when it is judged whether it is matched, it may perform a comparison starting from the data with the highest efficiency, for example, a dimension which does not need extra computation, e.g., the file size and file modification time, because the file size and file modification time are the system data which can be obtained when traversing files and which does not need extra operations, and such an operation may increase the efficiency of comparing and matching of a preset cache.

Optionally, when matching:

step S31: when the file size and file modification time match a piece of characteristic information in a database, performing the cyclical redundancy check computation on the file name to get a file name CRC value, and matching the file name CRC value with the file name CRC value of the piece of characteristic information. Therein, the CRC operation of the file name is a memory operation and the data amount is very small.

On matching, matching is first performed from a dimension with a high matching efficiency. In the dimensions of a piece of characteristic information in the data packet, the file size and file modification time do not need extra computation and may be directly matched. Then, when a client scans, for the file size and file modification time of the obtained characteristic information, it may for example first compare the file size, and then compare the file modification time. If the file size and file modification time of the currently scanned file are the same, then it compares a dimension with a relative small amount of computation, for example, it computes a file name CRC value by the CRC operation, then match the file name CRC value with the file name CRC value of the piece of characteristic information, and if they do not match, then the process goes to a full scanning, if they match, then the process goes to a dimension with a relative much amount of computation to conduct matching, e.g., goes to step S32.

In step S32, when the file name CRC value matches the file name CRC value of the piece of characteristic information, the message digest algorithm computation is performed on the file content description information to get content matching information, and the content matching information is matched with the content matching information of the piece of characteristic information.

When the file size, file modification time and file name CRC value are all matched, the message digest algorithm computation, generally the MD5 computation, is performed on the file content description information to get content matching information, then the content matching information is matched with the content matching information of the piece of characteristic information, if matched, the process skips the current file and goes to scan a next file.

In this application, upon matching, if there is a dimension in the characteristic information which is not matched, which means the file is not matched, then an anti-virus scanning may be performed on the file. For example, for the four dimensions of the characteristic information, the file size, file modification time, file name CRC value and content matching information, the matching order of the four dimensions is: 1. file size, 2. file modification time, 3. file name CRC value and 4. content matching information; if not matched when the file size of a file A is matched with the first dimension, i.e., the file size, of characteristic information in the data packet, the matching of the $2^{nd}$, $3^{rd}$ and $4^{th}$ dimensions may not need to be conducted, and an anti-virus scanning may need to be performed on the file A; if the file size of the file A is matched, then if not matched when the file modification time of the file A is matched with the second dimension, i.e., the file modification time, of the characteristic information in the data packet, the matching of the $3^{rd}$, and $4^{th}$ dimensions may not need to be conducted, and an anti-virus scanning may be performed on the file A. Other circumstances may be deducted by analogy.

In addition, in each scanning, optionally, when the first client scans, the characteristic information of a secure file in the scanning result at this time is stored in a secure file information list of the data packet; and when the first client scans a next time, scanning is performed according to the record after the last scanning.

When the first client scans in connection with the current data packet, for a file with characteristic information not comprised in the data packet, if it is detected to be secure this time, the characteristic information of the secure file may be stored in the secure file information list of the data packet, and when the first client performs a next scanning, it can scans more rapidly according to the result of the last scanning. In addition, when a client performs a full scanning on individual files, if a certain file is detected to be insecure, but the characteristic information of the file is comprised in the data packet, it may be deleted from the secure file information list in the data packet.

Correspondingly, referring to FIG. 4, this application further discloses a structural diagram of a system for rapidly scanning a file comprising:

a first client 410, which first client comprises:

an obtaining module S411 configured to obtain a data packet, the data packet comprising secure file characteristic information for determining whether a file in a system is a secure file; and a scanning & matching module S412 configured to scan file characteristic information of files in the system one by one, if the currently scanned file characteristic information matches secure file characteristic information in the data packet identifying a file as a secure file, skip an anti-virus scanning for the current file, and continue to scan a next file.

Figure 5:
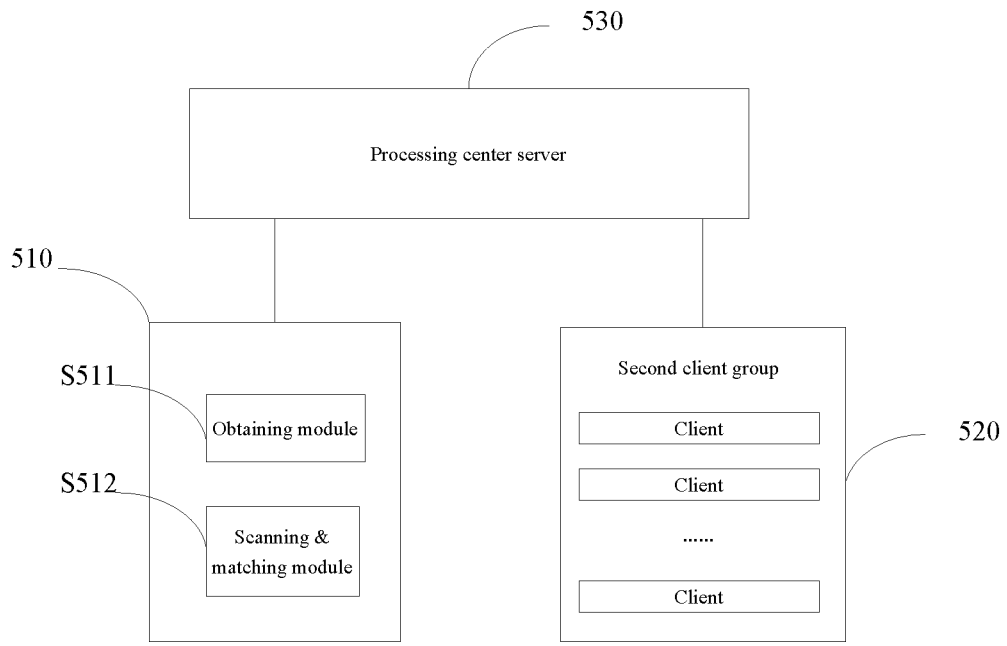
FIG. 5 is a structural diagram of a system for rapidly scanning a file according to an embodiment of the invention.

Reference is made to FIG. 5, which shows a structural diagram of a system for rapidly scanning a file according to an embodiment of the invention comprising:

a first client 510, a second client group 520 and a processing center server 530;

the first client 510 comprising:

an obtaining module S511 configured to obtain a data packet, the data packet comprising secure file characteristic information for determining whether a file in a system is a secure file; and a scanning & matching module S512 configured to scan file characteristic information of files in the system one by one, if the currently scanned file characteristic information matches secure file characteristic information in the data packet identifying a file as a secure file, skip an anti-virus scanning for the current file, and continue to scan a next file;

the processing center server 530 configured to perform statistics on secure file characteristic information sent to the processing center server by individual clients to obtain characteristic information in the data packet;

the second client group 520 configured to send characteristic information of secure files.

Optionally, the processing center server comprises:

a characteristic information module configured to receive characteristic information of secure files sent by individual clients, the characteristic information comprising the characteristic information of a file determined to be secure when the file is fully scanned by client;

a statistical module configured to, for identical characteristic information, count its number of repetitions; and an extracting module configured to extract characteristic information with the number of repetitions greater than or no less than a number threshold.

Optionally, individual clients of the second client group comprise:

a characteristic information obtaining unit configured to, when the scanned file is secure, obtain the characteristic information of the file, which characteristic information comprises the file name, file size, file modification time and file content description information;

a file name computing unit configured to perform a cyclical redundancy check computation on the file name to get a file name CRC value;

a content description information computing unit configured to perform a message digest algorithm computation on the file content description information to get content matching information; and a characteristic information sending unit configured to send characteristic information comprising the file size, file modification time, file name CRC value and content matching information.

Optionally, the statistical module comprises:

a ranking unit configured to rank the received characteristic information according to the total number of repetitions;

a de-duplication unit configured to, for individual identical characteristic information, perform a de-duplication operation on identical characteristic information sent by one and the same client; and a statistical unit configured to, for individual identical de-duplicated characteristic information, count the number of repetitions of individual characteristic messages.

Optionally, when a client fully scans a file, the system API function GetTickCount is called to compute the scanning time from the start of file scanning to the end of file scanning according to the points in time at which the file scanning begins and the file scanning finishes.

Optionally, after the extracting module, there is further comprised:

a generating unit configured to store the extracted characteristic information in a data file, and generate a data packet according to the data file.

Optionally, before the generation of a data packet, there is further comprised:

a removing unit configured to receive the characteristic information of an insecure file sent by the client, and not store the characteristic information in the data file, or delete characteristic information in the data packet identical to the received characteristic information.

Optionally, the characteristic information of the file is matched with characteristic information in the data packet by the following method:

matching is conducted starting from the characteristic information with the highest matching efficiency in a cache.

Optionally, when the file size and file modification time match a piece of characteristic information in a database, the cyclical redundancy check computation is performed on the file name to get a file name CRC value, and matching the file name CRC value with the file name CRC value of the piece of characteristic information; and when the file name CRC value matches the file name CRC value of the piece of characteristic information, the message digest algorithm computation is performed on the file content description information to get content matching information, and matching the content matching information with the content matching information of the piece of characteristic information.

Optionally, there is further comprised:

a prompting module configured to, upon scanning the first time, prompt the first client whether to select a rapid scanning, and if it selects, then scan characteristic information of a file and call the data packet to conduct matching.

Optionally, there is further comprised: a record updating module configured to, when the first client scans, store the characteristic information of a secure file in the scanning result at this time in a secure file information list of the data packet; and when the first client scans a next time, scan according to the secure record result after the last scanning.

For the embodiment of the system, its description is relatively simple, since it is basically similar to the embodiment of the method; for the relevant parts, reference is made to those of the embodiment of the method.

Figure 6:
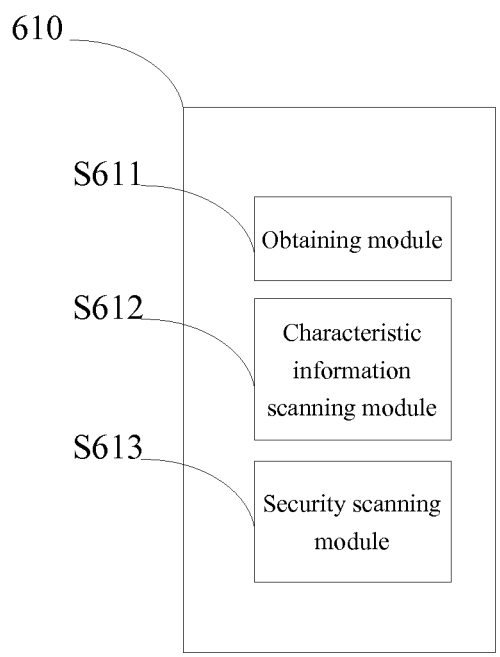
FIG. 6 is a structural diagram of a system for rapidly scanning a file according to an embodiment of the invention.

Reference is made to FIG. 6, which shows a structural diagram of a system for rapidly scanning a file according to an embodiment of the invention comprising a first client 610, which first client comprises:

an obtaining module S611 configured to obtain a data packet, the data packet comprising secure file characteristic information for determining whether a file in a system is a secure file;

a characteristic information scanning module S612 configured to scan characteristic information of files in the system one by one, and match the characteristic information with characteristic information in the data packet; when they match, skip the current file and continue to scan a next file; and when they do not match, skip the current file, continue to scan a next file and notifying a security scanning module to fully scan the file; and the security scanning module S613 configured to, for the unmatched file, performing a full scanning on the file.

Figure 7:
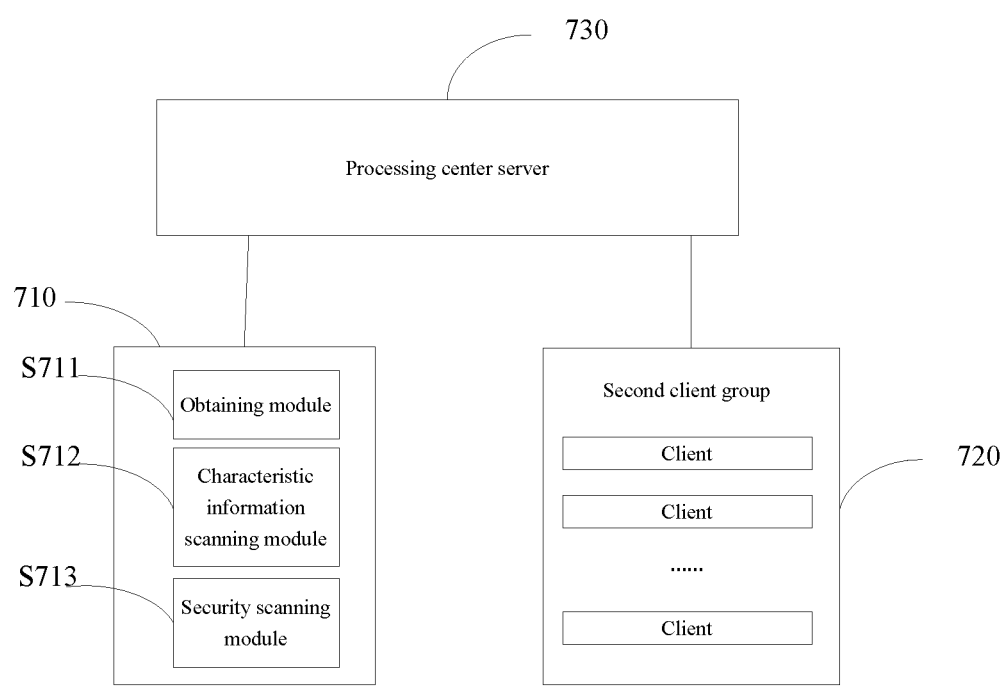
FIG. 7 is a structural diagram of a system for rapidly scanning a file according to an embodiment of the invention.

Reference is made to FIG. 7, which shows a structural diagram of a system for rapidly scanning a file according to an embodiment of the invention comprising:

a first client 710, a second client group 720 and a processing center server 730;

the first client 710 comprising:

an obtaining module S711 configured to obtain a data packet, the data packet comprising secure file characteristic information for determining whether a file in a system is a secure file; and a characteristic information scanning module S712 configured to scan characteristic information of files in the system one by one, and match the characteristic information with secure file characteristic information in the data packet identifying a file as a secure file; for the matched file, not perform an anti-virus scanning on the file; and for the unmatched file, notify the security scanning module to perform an anti-virus scanning on the file;

the security scanning module S713 configured to, for the unmatched file, perform an anti-virus scanning on the file.

the processing center server 730 configured to perform statistics on secure file characteristic information sent to the processing center server by individual clients to obtain the characteristic information of the secure file;

the second client group 720 configured to send characteristic information of secure files.

Optionally, the processing center server comprises:

a characteristic information module configured to receive characteristic information of secure files sent by individual clients, the characteristic information comprising the characteristic information of a file determined to be secure when the file is fully scanned by client;

a statistical module configured to, for identical characteristic information, count its number of repetitions; and an extracting module configured to extract characteristic information with the number of repetitions greater than or no less than a number threshold.

Optionally, individual clients of the second client group comprise:

a characteristic information obtaining unit configured to, when the scanned file is secure, obtain the characteristic information of the file, which characteristic information comprises the file name, file size, file modification time and file content description information;

a file name computing unit configured to perform a cyclical redundancy check computation on the file name to get a file name CRC value;

a content description information computing unit configured to perform a message digest algorithm computation on the file content description information to get content matching information; and a characteristic information sending unit configured to send characteristic information comprising the file size, file modification time, file name CRC value and content matching information.

Optionally, the statistical module comprises:

a ranking unit configured to rank the received characteristic information according to the total number of repetitions;

a de-duplication unit for, for individual identical characteristic information, perform a de-duplication operation on identical characteristic information sent by one and the same client; and a statistical unit configured to, for individual identical de-duplicated characteristic information, count the number of repetitions of individual characteristic messages.

Optionally, when a client fully scans a file, the system API function GetTickCount is called to compute the scanning time from the start of file scanning to the end of file scanning according to the points in time at which the file scanning begins and the file scanning finishes.

Optionally, after the extracting module, there is further comprised:

a generating unit configured to store the extracted characteristic information in a data file, and generate a data packet according to the data file.

Optionally, before the generation of a data packet, there is further comprised:

a removing unit configured to receive the characteristic information of an insecure file sent by the client, and not store the characteristic information in the data file, or delete characteristic information in the data packet identical to the received characteristic information.

Optionally, matching the characteristic information of the file with characteristic information in the data packet by the following method:

matching is conducted starting from the characteristic information with the highest matching efficiency in a cache.

Optionally, when the file size and file modification time match a piece of characteristic information in a database, the cyclical redundancy check computation is performed on the file name to get a file name CRC value, and matching the file name CRC value with the file name CRC value of the piece of characteristic information; and when the file name CRC value matches the file name CRC value of the piece of characteristic information, the message digest algorithm computation is performed on the file content description information to get content matching information, and matching the content matching information with the content matching information of the piece of characteristic information.

Optionally, there is further comprised:

a prompting module configured to, upon scanning the first time, prompt the first client whether to select a rapid scanning, and if it selects, then scan characteristic information of a file and call the data packet to conduct matching.

Figure 8:
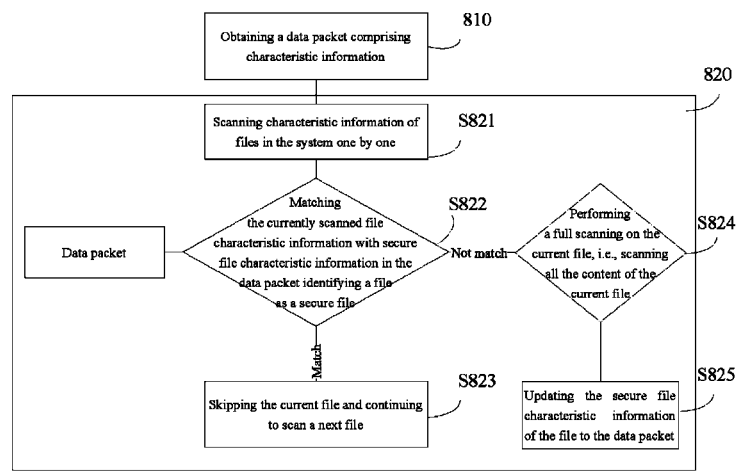
FIG. 8 is a flow diagram of a method for rapidly scanning a file according to an embodiment of the invention.

Reference is made to FIG. 8, which shows a flow diagram of a method for rapidly scanning a file according to an embodiment of the invention comprising the following steps.

In step 810, obtaining a data packet, the data packet comprising secure file characteristic information for determining whether a file in a system is a secure file.

In step 820, scanning file characteristic information of files in the system one by one, and matching the currently scanned file characteristic information with secure file characteristic information in the data packet identifying a file as a secure file; if they match, then skipping an anti-virus scanning for the current file, and continuing to scan a next file; if they do not match, performing an anti-virus scanning on the current file, and when the scanning time is greater than or no less than a time threshold and the file is secure, the secure file characteristic information of the file is updated to the data packet.

For example, an anti-virus scanning is performed on a malicious code or virus, etc. comprised in the file content.

After the data is obtained, a rapid scanning may be performed.

In step S821, the system of the first client scans characteristic information of files in the system one by one.

In step S822, matching the currently scanned file characteristic information with secure file characteristic information in the data packet identifying a file as a secure file; if they match, the process goes to step S823, skips the current file and continues to scan a next file; and if they do not match, the process goes to step S824, and performs a full anti-virus scanning on the current file, and when the scanning time is greater than or no less than a threshold and the file is secure, the process goes to step S825, where the secure file characteristic information of the file is updated to the data packet.

In practice, the characteristic information in step S825 may be obtained by the following steps:

step M1: obtaining the characteristic information of the file, which characteristic information comprises the file name, file size, file modification time and file content description information;

step M2: performing a cyclical redundancy check computation on the file name to get a file name CRC value;

step M3: performing a message digest algorithm computation on the file content description information to get content matching information; and step M4: taking characteristic information comprising the file size, file modification time, file name CRC value and content matching information as secure file characteristic information. The particular approaches for step M1 to step M4 are similar to the above described step S11 to S14.

Therein, in the process of updating a data packet, the characteristic information of secure files may be directly updated to a data packet in the local system, or also the characteristic information of secure files may be sent to the processing center server, and updated to a data packet of a corresponding individual application side by the processing center server according to its rule.

In practice, before the first client scans, there is further comprised: confirming whether to select a rapid scanning or not, and if yes, scanning characteristic information of a file and calling the data packet to conduct matching.

In other words, the first client may select a rapid scanning or a full scanning of a file, and if a fast scanning is selected, scan characteristic information of a file and call the data packet to conduct matching of characteristic information. When the characteristic information of the file matches characteristic information in the data packet, it skips the current file and continues to scan a next file.

In this application, upon scanning the first time, the first client may be prompted whether to select a rapid scanning, and if it selects, then characteristic information of a file is scanned and the data packet is called to conduct matching.

If the first client selects a rapid scanning, when scanning, the first client first obtains characteristic information of a file in the first client to conduct matching, without the need to scan all the content of the file.

Figure 9:
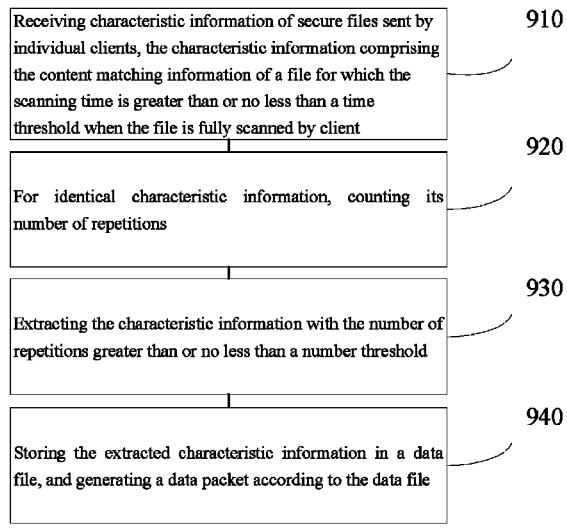
FIG. 9 is a flow diagram of a method for generating a data packet according to an embodiment of the invention.

Reference is made to FIG. 9, which shows a flow diagram of a method for generating a data packet according to an embodiment of the invention comprising the following steps.

In step 910, receiving characteristic information of secure files sent by individual clients, the characteristic information comprising the characteristic information of a secure file for which the file scanning time is greater than or no less than a time threshold when the file is fully scanned by client.

Optionally, when files are fully scanned by the clients, and when the scanning time is greater than or no less than the time threshold and the files are secure, the full scanning is to perform an anti-virus scanning on all the content of individual files in a system of a client.

In step 920, for identical characteristic information, counting its number of repetitions.

In step 930, extracting the characteristic information with the number of repetitions greater than or no less than a number threshold.

In step 940, storing the extracted characteristic information in a data file, and generating a data packet according to the data file.

For steps similar to other embodiments, a detailed description will not be repeated here.

Embodiments of the individual components of the invention may be implemented in hardware, or in a software module running on one or more processors, or in a combination thereof. It will be appreciated by those skilled in the art that, in practice, some or all of the functions of some or all of the components in a device according to individual embodiments of the invention may be realized using a microprocessor or a digital signal processor (DSP). The invention may also be implemented as an apparatus or a device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 10:
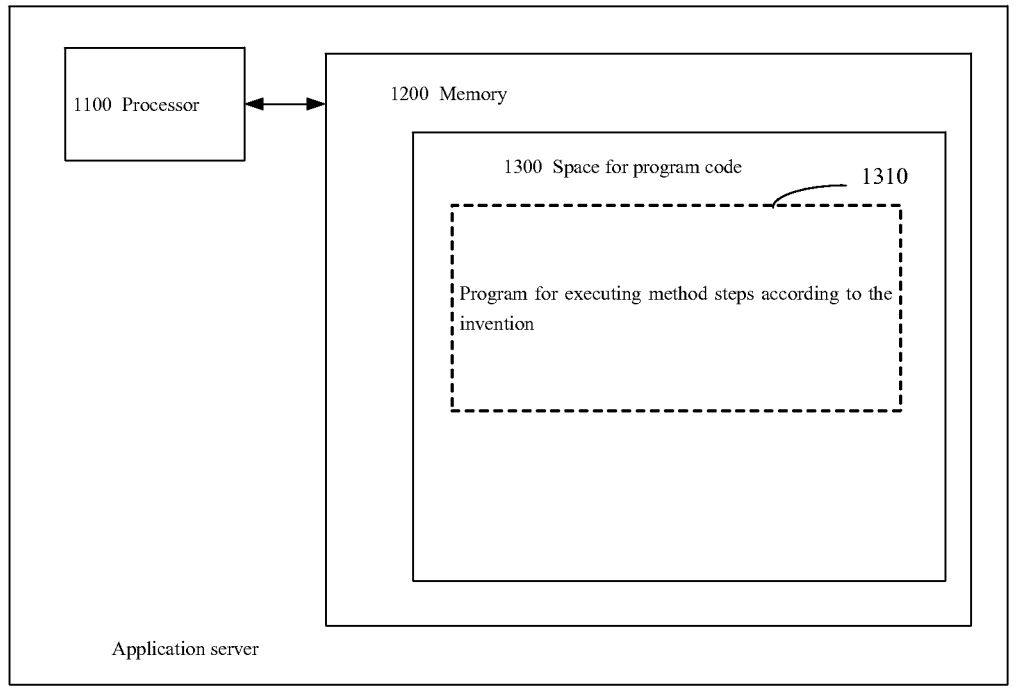
FIG. 10 schematically shows a block diagram of a server for carrying out a method according to the invention.
Figure 11:
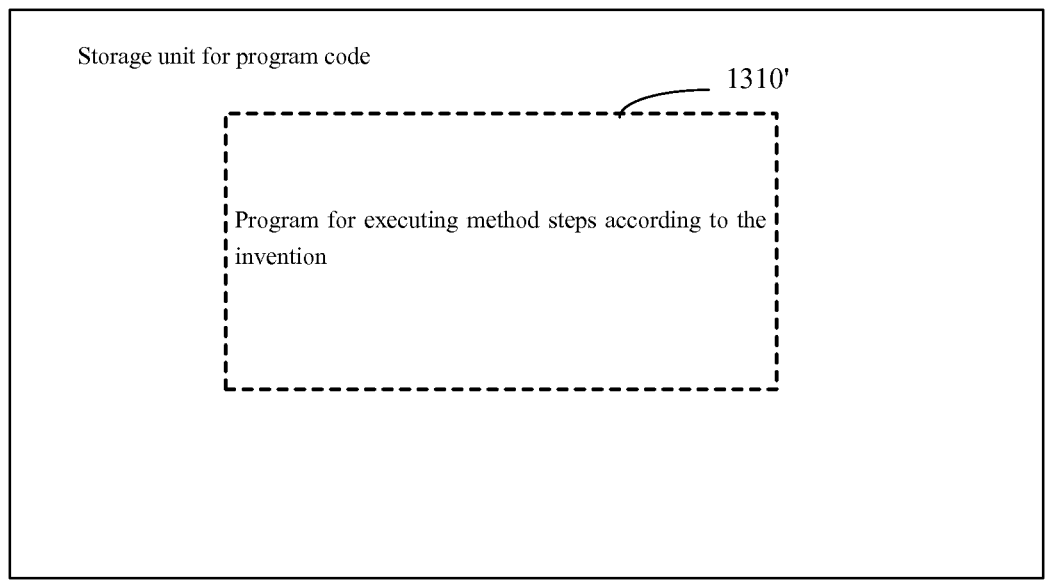
FIG. 11 schematically shows a storage unit for retaining or carrying a program code for implementing a method according to the invention.

For example, FIG. 10 shows a server which may carry out a method for rapidly scanning a file according to the invention, e.g., an application server. The server traditionally comprises a processor 1100 and a computer program product or a computer readable medium in the form of a memory 1200. The memory 1200 may be an electronic memory such as a flash memory, an EEPROM (electrically erasable programmable read-only memory), an EPROM, a hard disk or a ROM. The memory 1200 has a memory space 1300 for a program code 1310 for carrying out any method steps in the methods as described above. For example, the memory space 1300 for a program code may comprise individual program codes 1310 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 11. The storage unit may have a memory segment, a memory space, etc. arranged similarly to the memory 1200 in the server of FIG. 10. The program code may for example be compressed in an appropriate form. In general, the storage unit comprises a computer readable code 1310', i.e., a code which may be read by e.g., a processor such as 1100, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for rapidly scanning a file comprising:
obtaining a data packet, the data packet comprising secure file characteristic information for determining whether a file in a system is a secure file; and
scanning file characteristic information of files in the system one by one, if the currently scanned file characteristic information matches secure file characteristic information in the data packet identifying a file as a secure file, skipping an anti-virus scanning for the current file, and continuing to scan a next file;
wherein, the secure file characteristic information is obtained by collecting statistics of characteristic information of secure files sent to a processing center server by individual clients, which comprises:
fully scanning a file, when the scanned file is secure, obtaining the characteristic information of the file, which characteristic information comprises the file name, file size, file modification time and file content description information;
performing a cyclical redundancy check computation on the file name to get a file name CRC value;
performing a message digest algorithm computation on the file content description information to get content matching information;
obtaining the characteristic information of the secure file comprising the file size, file modification time, file name CRC value and content matching information:
for identical characteristic information, counting a number of repetitions; and
extracting characteristic information with the number of repetitions greater than or no less than a number threshold.

2. The method according to claim 1, wherein
if the currently scanned file characteristic information does not match secure file characteristic information in the data packet, performing an anti-virus scanning on the current file, and when the scanning time is greater than or no less than a time threshold and the file is secure, updating the secure file characteristic information of the file to the data packet.

3. The method according to claim 1, wherein for identical characteristic information, the number of repetitions is counted by:
ranking the received characteristic information according to the total number of repetitions;
for individual identical characteristic information, performing a de-duplication operation on identical characteristic information sent by the same client; and
for individual identical de-duplicated characteristic information, counting the number of repetitions of individual characteristic information.

4. The method according to claim 1, wherein after extracting characteristic information with the number of repetitions greater than or no less than a number threshold, the method further comprises:
   storing the extracted characteristic information in a data file, and generating a data packet according to the data file.

5. The method according to claim 1, wherein before the generation of a data packet, the method further comprises:
   receiving the characteristic information of an insecure file sent by the client, and not storing the characteristic information in a data file, or deleting characteristic information in the data packet identical to the received characteristic information.

6. The method according to claim 1, wherein
   after the previous data packet is generated, when the statistics relate to the characteristic information of a new secure file, updating the characteristic information of the new secure file to the previous data packet.

7. The method according to claim 1, wherein matching the characteristic information of the file with the secure file characteristic information in the data packet comprises:
   starting from the characteristic information with a highest matching efficiency in a cache.

8. The method according to claim 7, wherein
   when the file size and file modification time match a piece of characteristic information in a database, the cyclical redundancy check computation is performed on the file name to get a file name CRC value, and matching the file name CRC value with the file name CRC value of the piece of characteristic information; and
   when the file name CRC value matches the file name CRC value of the piece of characteristic information, the message digest algorithm computation is performed on the file content description information to get content matching information, and matching the content matching information with the content matching information of the piece of characteristic information.

9. A system for rapidly scanning a file comprising:
   a first client, comprising:
   a memory having instructions stored thereon;
   a processor configured to execute the instructions to perform operations for rapidly scanning a file, the operations comprising:
   obtaining a data packet, the data packet comprising secure file characteristic information for determining whether a file in a system is a secure file; and
   scanning file characteristic information of files in the system one by one, if the currently scanned file characteristic information matches secure file characteristic information in the data packet identifying a file as a secure file, skipping an anti-virus scanning for the current file, and continue to scan a next file;
   a second client group, wherein individual clients of the second client group comprise:
   a memory having instructions stored thereon;
   a processor configured to execute the instructions to perform operations comprising:
   fully scanning a file, when the scanned file is secure, obtaining the characteristic information of the file, which characteristic information comprises the file name, file size, file modification time and file content description information;
   performing a cyclical redundancy check computation on the file name to get a file name CRC value;
   performing a message digest algorithm computation on the file content description information to get content matching information; and
   obtaining the characteristic information of the secure file comprising the file size, file modification time, file name CRC value and content matching information;
   a processing center server to collect statistics of characteristic information of secure files sent to the processing center server by individual clients to obtain the secure file characteristic information in the data packet, which comprises:
   a memory having instructions stored thereon;
   a processor configured to execute the instructions to perform operations comprising:
   receiving characteristic information of secure files sent by individual clients, the characteristic information comprising the characteristic information of a file determined to be secure when the file is fully scanned by client;
   for identical characteristic information, counting a number of repetitions; and
   extracting characteristic information with the number of repetitions greater than or no less than a number threshold.

10. The system according to claim 9, wherein for identical characteristic information, the number of repetitions is counted by:
    ranking the received characteristic information according to the total number of repetitions;
    for individual identical characteristic information, performing a de-duplication operation on identical characteristic information sent by the same client; and
    for individual identical de-duplicated characteristic information, counting the number of repetitions of individual characteristic information.

11. The system according to claim 9, wherein after extracting characteristic information with the number of repetitions greater than or no less than a number threshold, the operations further comprising:
    storing the extracted characteristic information in a data file, and generating a data packet according to the data file.

12. The system according to claim 9, wherein before the generation of a data packet, the operations further comprising:
    receiving the characteristic information of an insecure file sent by the client, and not storing the characteristic information in the data file, or deleting characteristic information in the data packet identical to the received characteristic information.

13. The system according to claim 9, wherein after the previous data packet is generated, when the statistics relate to the characteristic information of a new secure file, updating the characteristic information of the new secure file to the previous data packet.

14. A non-transitory computer readable medium having instructions stored thereon that, when executed by a computing device cause the computer device to preform operations for rapidly scanning a file, the operations comprising:
    obtaining a data packet, the data packet comprising secure file characteristic information for determining whether a file in a system is a secure file; and
    scanning file characteristic information of files in the system one by one, if the currently scanned file characteristic information matches secure file characteristic information in the data packet identifying a file as a secure file, skipping an anti-virus scanning for the current file, and continuing to scan a next file;

wherein, the secure file characteristic information is obtained by collecting statistics of characteristic information of secure files sent to a processing center server by individual clients, which comprises:

fully scanning a file, when the scanned file is secure, obtaining the characteristic information of the file, which characteristic information comprises the file name, file size, file modification time and file content description information;

performing a cyclical redundancy check computation on the file name to get a file name CRC value;

performing a message digest algorithm computation on the file content description information to get content matching information;

obtaining the characteristic information of the secure file comprising the file size, file modification time, file name CRC value and content matching information;

for identical characteristic information, counting a number of repetitions; and extracting characteristic information with the number of repetitions greater than or no less than a number threshold.

* * * * *